United States Patent
Ramesh et al.

(10) Patent No.: US 9,165,008 B1
(45) Date of Patent: Oct. 20, 2015

(54) SYSTEM AND METHOD FOR DATA COMPRESSION USING A DYNAMIC COMPRESSION DICTIONARY

(71) Applicant: Teradata Corporation, Dayton, OH (US)

(72) Inventors: Bhashyam Ramesh, Secunderabad (IN); Vinupriya Selvamanee, Chennai (IN); Jaiprakash Chimanchode, Secunderabad (IN)

(73) Assignee: Teradata US, Inc., Dayton, OH (US)

( * ) Notice: Subject to any disclaimer, the term of this patent is extended or adjusted under 35 U.S.C. 154(b) by 3 days.

(21) Appl. No.: 13/711,666

(22) Filed: Dec. 12, 2012

Related U.S. Application Data

(60) Provisional application No. 61/580,960, filed on Dec. 28, 2011.

(51) Int. Cl.
*G06F 17/30* (2006.01)
(52) U.S. Cl.
CPC .................................. *G06F 17/30153* (2013.01)
(58) Field of Classification Search
USPC ........ 707/5, 607, 693, 748, 600; 341/51, 106; 709/206
See application file for complete search history.

(56) References Cited

U.S. PATENT DOCUMENTS

| | | | | |
|---|---|---|---|---|
| 5,534,861 | A * | 7/1996 | Chang et al. | 341/79 |
| 5,592,667 | A * | 1/1997 | Bugajski | 1/1 |
| 5,872,530 | A * | 2/1999 | Domyo et al. | 341/106 |
| 6,415,295 | B1 * | 7/2002 | Feinberg | 1/1 |
| 7,904,432 | B2 * | 3/2011 | McKay et al. | 707/693 |
| 2003/0084041 | A1 * | 5/2003 | Dettinger | 707/5 |
| 2011/0043387 | A1 * | 2/2011 | Abali et al. | 341/51 |
| 2011/0307440 | A1 * | 12/2011 | Panchenko | 707/600 |
| 2012/0117082 | A1 * | 5/2012 | Koperda et al. | 707/748 |
| 2012/0296983 | A1 * | 11/2012 | Boehm | 709/206 |
| 2013/0110766 | A1 * | 5/2013 | Promhouse et al. | 707/607 |

* cited by examiner

*Primary Examiner* — Mariela Reyes
*Assistant Examiner* — Thong Vu
(74) *Attorney, Agent, or Firm* — James Stover

(57) ABSTRACT

A system and method for compressing data. The system and method employ a static compression dictionary, or look-up table, containing a predetermined number of uncompressed data values and corresponding compressed code values for replacing uncompressed data values with their corresponding compressed code values to reduce data storage requirements. The system and method further employ a dynamic compression dictionary, to which uncompressed data values and corresponding compressed code values are added as required to compress uncompressed data values not contained within the static compression dictionary.

12 Claims, 9 Drawing Sheets

| 410 | 415 | 420 |
|---|---|---|
| 130 SUTTER ST. | SAN FRANCISCO | CA — 405 |
| 333 WACKER DRIVE | CHICAGO | IL |
| 5 TIMES SQUARE | NEW YORK | NY |
| 900 NORTH MICHIGAN AVENUE | CHICAGO | IL — 430 |
| 135 EAST 57TH | NEW YORK | NY |
| 1525 HOWE ST. | RACINE | WI |
| 304 S. BROADWAY | LOS ANGELES | CA |

SYSTEM AND METHOD FOR DATA COMPRESSION USING A DYNAMIC COMPRESSION DICTIONARY

CROSS REFERENCE TO RELATED APPLICATIONS

This application claims priority under 35 U.S.C. §119(e) to the following commonly-assigned patent applications, which are incorporated herein by reference:

Provisional Patent Application Ser. No. 61/580,960, entitled "SYSTEM AND METHOD FOR DATA COMPRESSION USING A DYNAMIC COMPRESSION DICTIONARY," filed on Dec. 28, 2011, by Bhashyam Ramesh, Vinupriya Selvamanee, and Jaiprakash C.

FIELD OF THE INVENTION

The present invention relates to methods and systems for compressing electronic data for storage or transmission; and in particular to improved value list compression techniques for compressing data stored in database tables including column partitioned tables.

BACKGROUND OF THE INVENTION

The amount of data generated, collected and saved by businesses is increasing at an unprecedented rate. Businesses are retaining enormous amounts of detailed data, such as call detail records, transaction history, and web clickstreams, and then mining it to identify business value. Regulatory and legal retention requirements add to this burden by requiring businesses to maintain years of accessible historical data.

As businesses enter an era of petabyte-scale data warehouses, advanced technologies, such as data compression, are increasingly utilized to effectively maintain enormous data volumes in the warehouse. Data compression reduces storage cost by storing more logical data per unit of physical capacity. Performance is improved because there is less physical data to retrieve during database queries.

One current technique for compressing data, known as Value List Compression, may be applied to compress column data within a database table. A set of values are identified in a dictionary and any occurrence of a dictionary value in a row is compressed in the sense it is not recorded in the row, but a pointer to the dictionary value is recorded in the row header. An occurrence of a value that is not in the dictionary is stored as an uncompressed value.

Value List compression techniques can also be applied to a column partitioned table which stores multiple column values in a row. Such rows are called container rows in this document. Two sets of structures exist in a container row for this purpose: a fixed length compression dictionary, called static compression dictionary, SCD; and a list of uncompressed values, called the uncompressed column value list.

After a container row has been auto-compressed and stored, values that arrive later for insertion into the table that are not available in the SCD are no longer added to the SCD, but are appended to the uncompressed column value list in the container row. The uncompressed value list is in the order of data arrival and therefore in the order of row-id. The uncompressed column value list is not sorted and built dynamically as values are inserted. In a container row there are some bits for each base table row value that is stored in the container row. These bits include information such as where the value is recorded in the row, whether the value exists or is NULL, whether the value exists in the dictionary or is uncompressed and so on. These bits are collectively called "auto compression bits" in this document.

The above structure and method for compressing container row data have the following drawbacks:

1. Access to an uncompressed value in a container row is expensive since two passes are needed to process the auto compression bits—a first pass to determine if a value is compressed; and if not, a second pass to determine the value's positional number within the uncompressed value list.
2. Inefficient compression. When a new value is stored as an uncompressed value it can only be added to the uncompressed list since the storage structure is a positional list.
3. Access to an uncompressed value degrades linearly with the number of values in the uncompressed list.
4. If a compressed value in a row is modified to an uncompressed value, the modification cannot occur in place. Instead the old row must be deleted and a new row must be inserted with a different row-id.

Described below is an improved database compression scheme that overcomes the disadvantaged discussed above.

BRIEF DESCRIPTION OF THE DRAWINGS

FIG. 4 is a representation of rows in a database table.

DETAILED DESCRIPTION OF THE INVENTION

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

Environment

Figure 1:
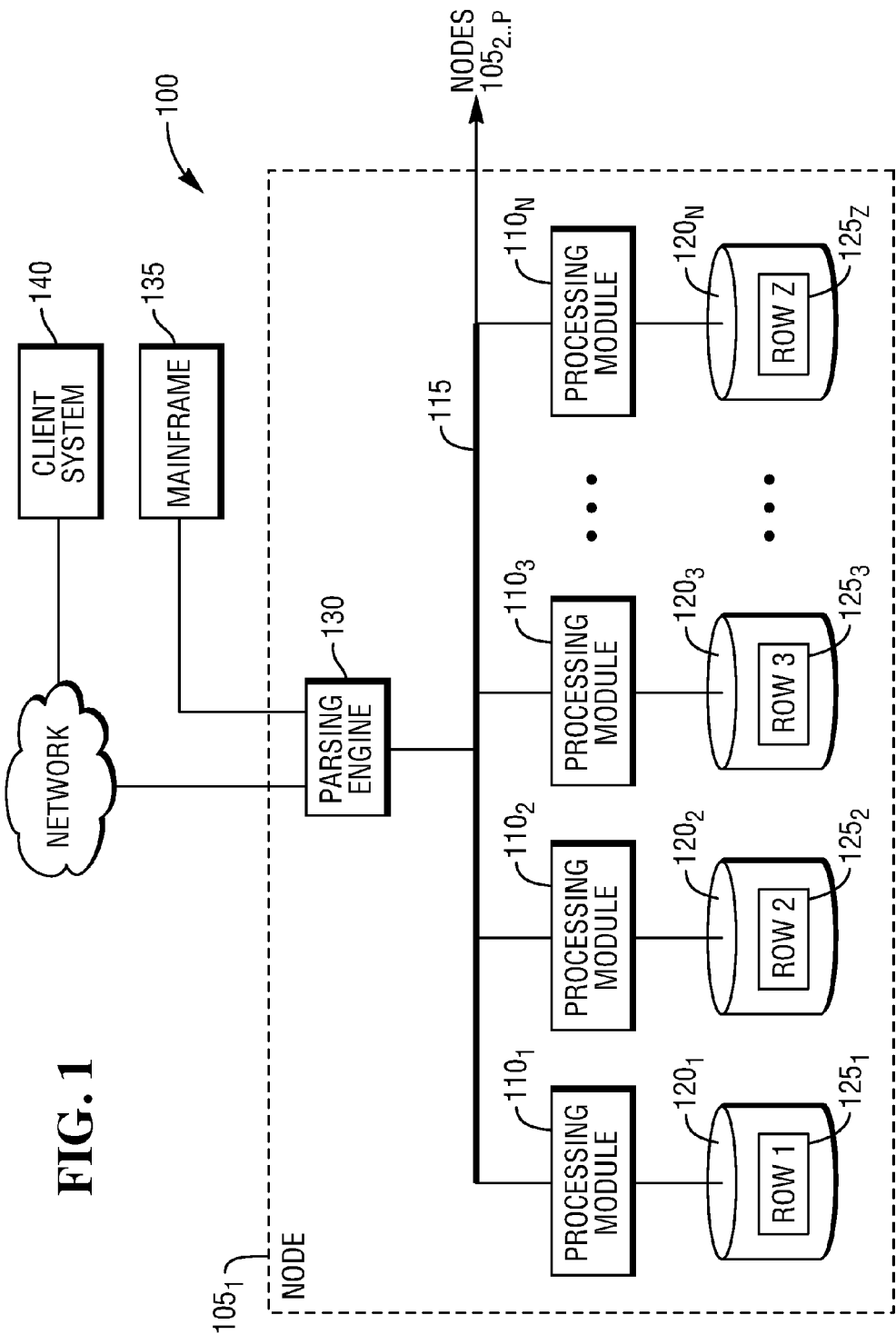
FIG. 1 is a block diagram of a node of a database system.

The technique for coding compressible database fields disclosed herein has particular application, but is not limited, to large databases that might contain many millions or billions of records managed by a database system ("DBS") 100, such as a Teradata Active Data Warehousing System available from Teradata Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots P}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
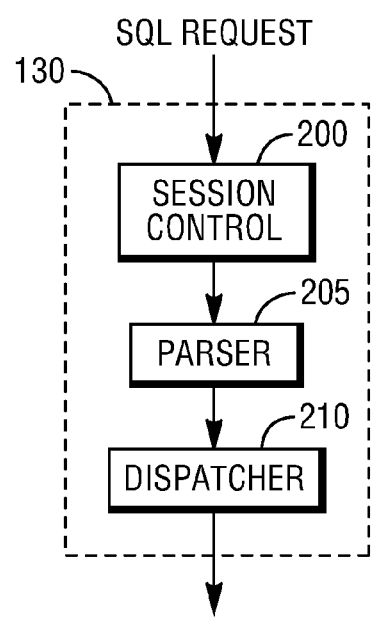
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
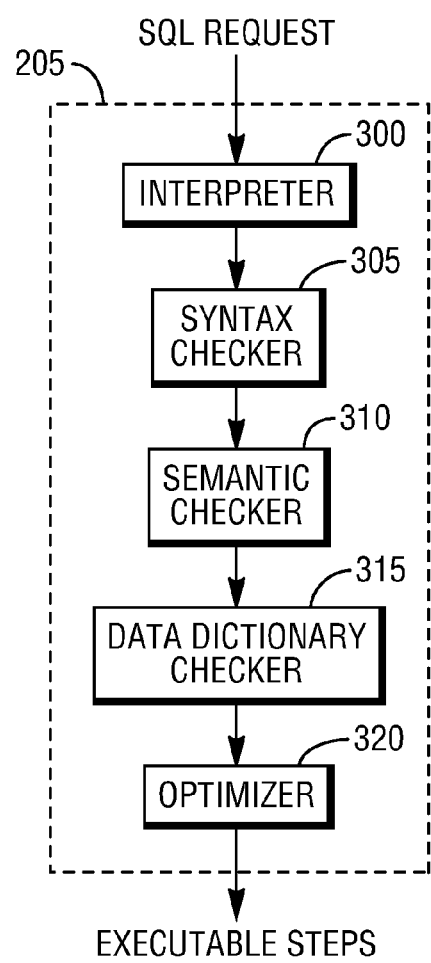
FIG. 3 is a flow chart of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which develops the least expensive plan to perform the request.

Value List Compression

An example of a table with a compressible field, illustrated in FIG. 4, includes rows, such as row 405; and fields, including a StreetAddress field 410, a City field 415, a State field 420, and other fields 425, such as indices, names, etc. As can be seen in FIG. 4, the City field has multiple instances of "New York," and "Chicago." Such a field is a compressible field because it can be compressed by representing each value in the field with a code that corresponds to the value.

Figure 5:
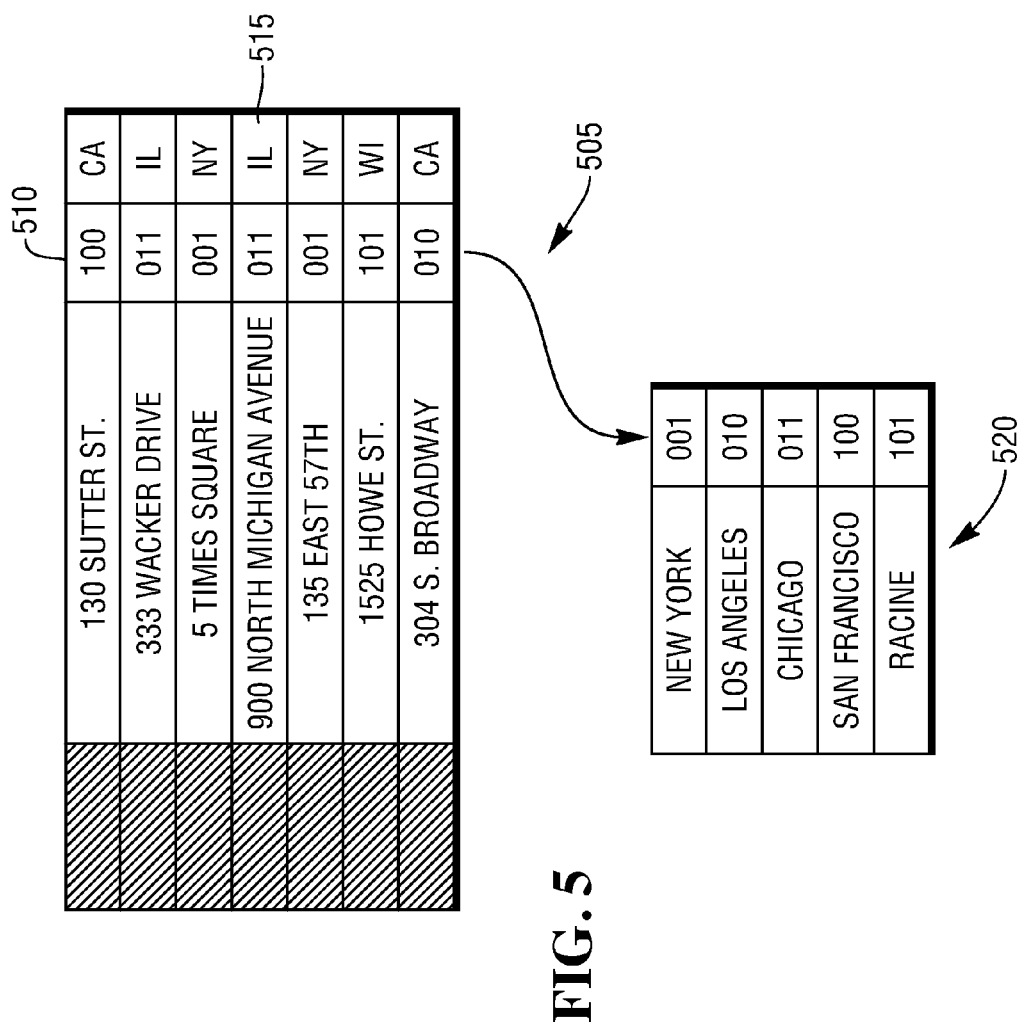
FIG. 5 is a representation of a prior art use of a compression dictionary.

In a typical existing system, an example of which is shown in FIG. 5, the compressible field in a table 505 is replaced by a code field 510. The code field includes a code, such as the binary bit sequence shown in FIG. 5, which represents the compressible field value associated with that row. For example, the value "Chicago" shown in row 430 of FIG. 4 is represented by the binary code "011" in row 515 of FIG. 5.

In some existing systems, a look-up table, or compression dictionary, 520 is provided to translate the code to the compressible field value. In relational databases using SQL, the compression dictionary 520 is frequently joined with the original table 505 during execution of queries that select information from the compressible field.

Figure 6:
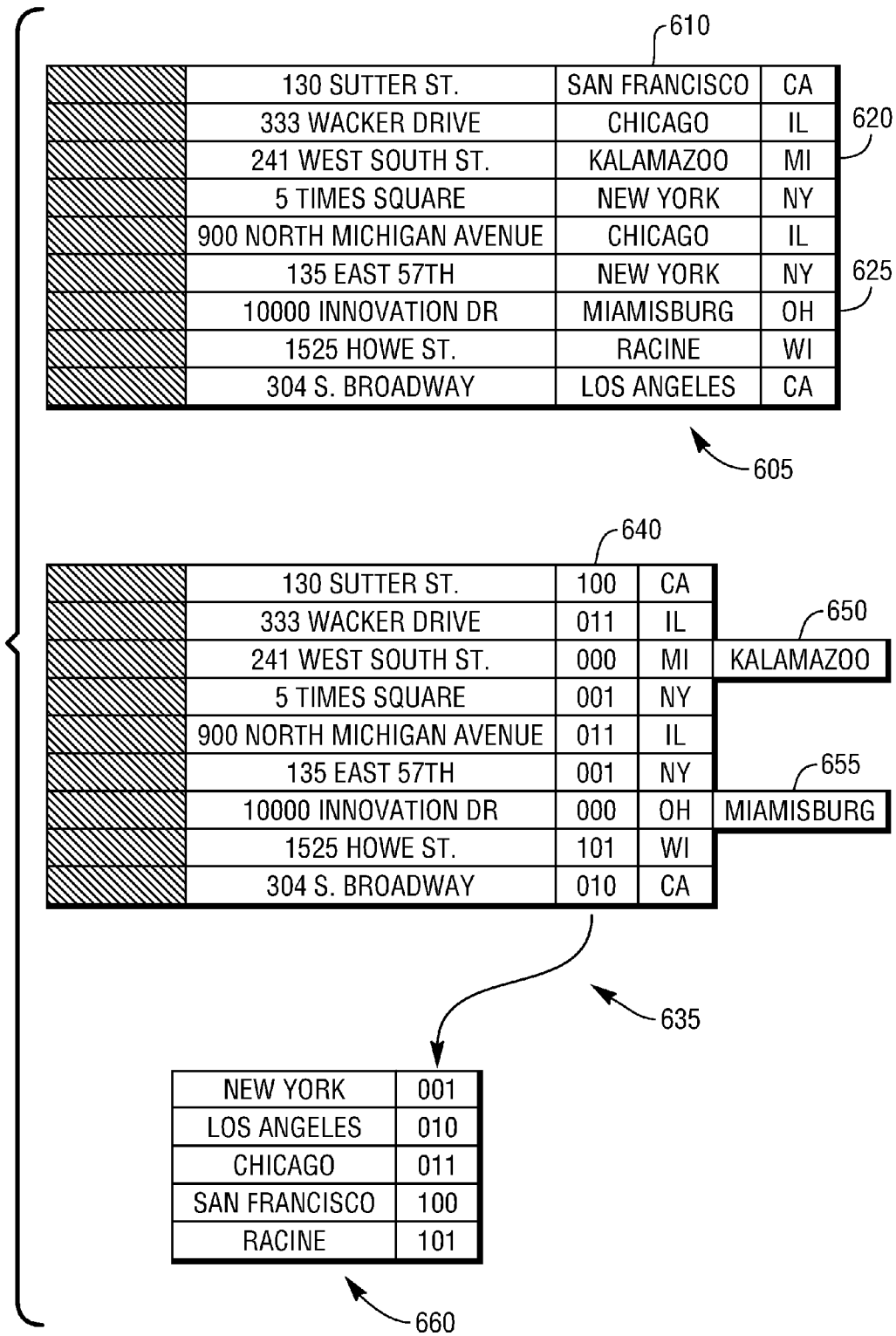
FIG. 6 is a representation of a prior art use of a compression dictionary, wherein not all values in the compressible field are included in the compression dictionary.

FIG. 6 provides an example of a database system for coding compressible fields using a compression dictionary, wherein not all values in the compressible field 610 in table 605 are included in the compression dictionary. The values not included in the compression dictionary may be less common values, or new values not contained in the original range of values and added to the field after creation of the compression dictionary. Table 605 illustrates the table prior to compression of values contained in field 610, and table 635 shows a table following the application of value-base compression using compression dictionary 660. Table 605 is similar to the table illustrated in FIG. 4, with the exception of two rows, identified by reference numerals 620 and 625, which include values in field 610, e.g., KALAMZOO and MIAMISBURG, values that are not included in the compression dictionary 660.

In table 635, field 610 has been replaced by a code field 640, wherein the values from field 610 have been replaced with compressed code values from compression dictionary 660 when available. For field 610 values not found in the compression dictionary, e.g., KALAMZOO and MIAMISBURG, the uncompressed values are appended to the ends of the rows 650 and 655, and a code, such as "000," indicating that an uncompressed value is appended to the end of the row, is stored in field 640.

Figure 7:
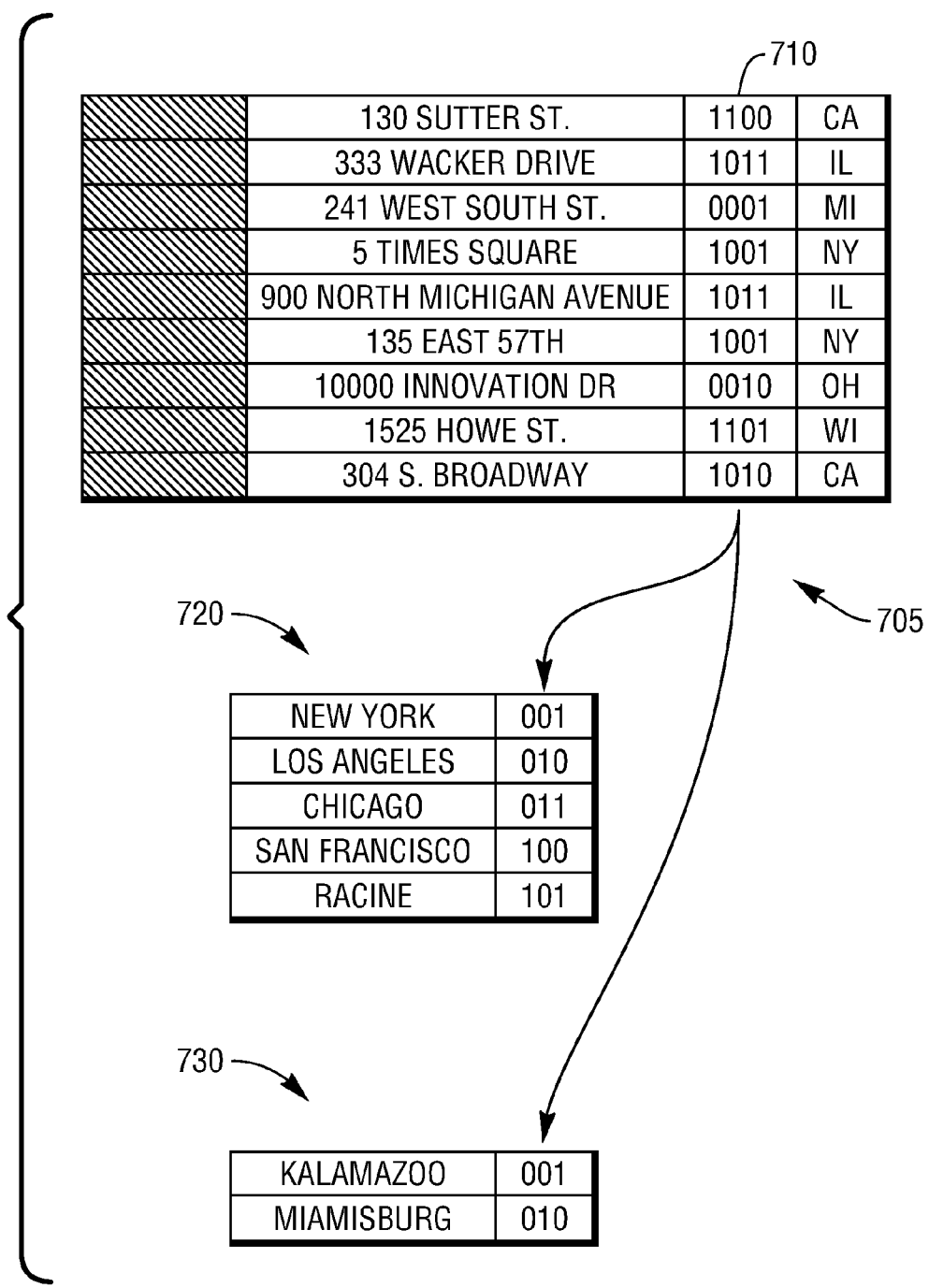
FIG. 7 is a representation of a process for compressing database table data utilizing a static compression dictionary and dynamic compression dictionary in accordance with the present invention.

FIG. 7 illustrates one embodiment of an improved process for compressing database table data utilizing both a static compression dictionary (SCD) 720 and a dynamic compression dictionary (DCD) 730. Table 705 shows a compressed version of table 605 following the application of value-base compression using this improved process. Static compression dictionary 720 is equivalent to compression dictionary 660 shown in FIG. 6 and discussed above. Dynamic compression dictionary 730 is a dictionary for uncompressed, or newly arriving, values. This dynamic compression dictionary is variable in size, and can grow as values are inserted. Code field 710 of table 705 contains compressed code values from static compression dictionary 720 when available and from dynamic compression dictionary 730 when the values are not contained in SCD 720. If an uncompressed value is not contained in either dictionary the uncompressed value and a corresponding compressed code value is added to the dynamic compression dictionary.

In the illustrated example table 710, the compressed code values in code field 710 are represented using a first bit to specify the dictionary from which the compressed code is obtained, such as "1" for SCD 720 and "0" for DCD 730, followed by the compressed code value from the applicable compression dictionary. As an alternative to using a first bit to specify the dictionary from which the compressed code is obtained, the index value itself can be used to differentiate between the SCD and DCD. For example, if the SCD has 100 values, then any index value in excess of 100 represents an index into the DCD.

Container Row Compression

Teradata Corporation provides a database solution, referred to as Teradata Columnar, that eliminates performance bottlenecks by storing data in columns, unlike most relational database management systems which only store data in rows. With a Teradata Columnar database system a user can mix-and-match columnar and row-based physical storage to best suit user applications, so that applications get the right data at the right time. With a Teradata Columnar database system, only the data in the columns required for a query are pulled into memory for processing, vastly reducing the time-constraining input/output (I/O) of a row-based approach that would read data from all the columns.

Within a Teradata Columnar database system, column-partitioned data can be stored in a container. A container has many data values packed into it with a single header. The physical space is allocated and managed by the Teradata file system, along with all other space in the Teradata Database. By filling a container with values from a single column and applying partition elimination logic, only the columns referenced in a query are read.

As discussed above, Value List compression techniques can also be applied to data saved in container rows. Similarly, the improved process for compressing database data utilizing both a static compression dictionary and a dynamic compression dictionary, described above for a row-based storage system, can be implemented within a columnar system.

Figure 8:
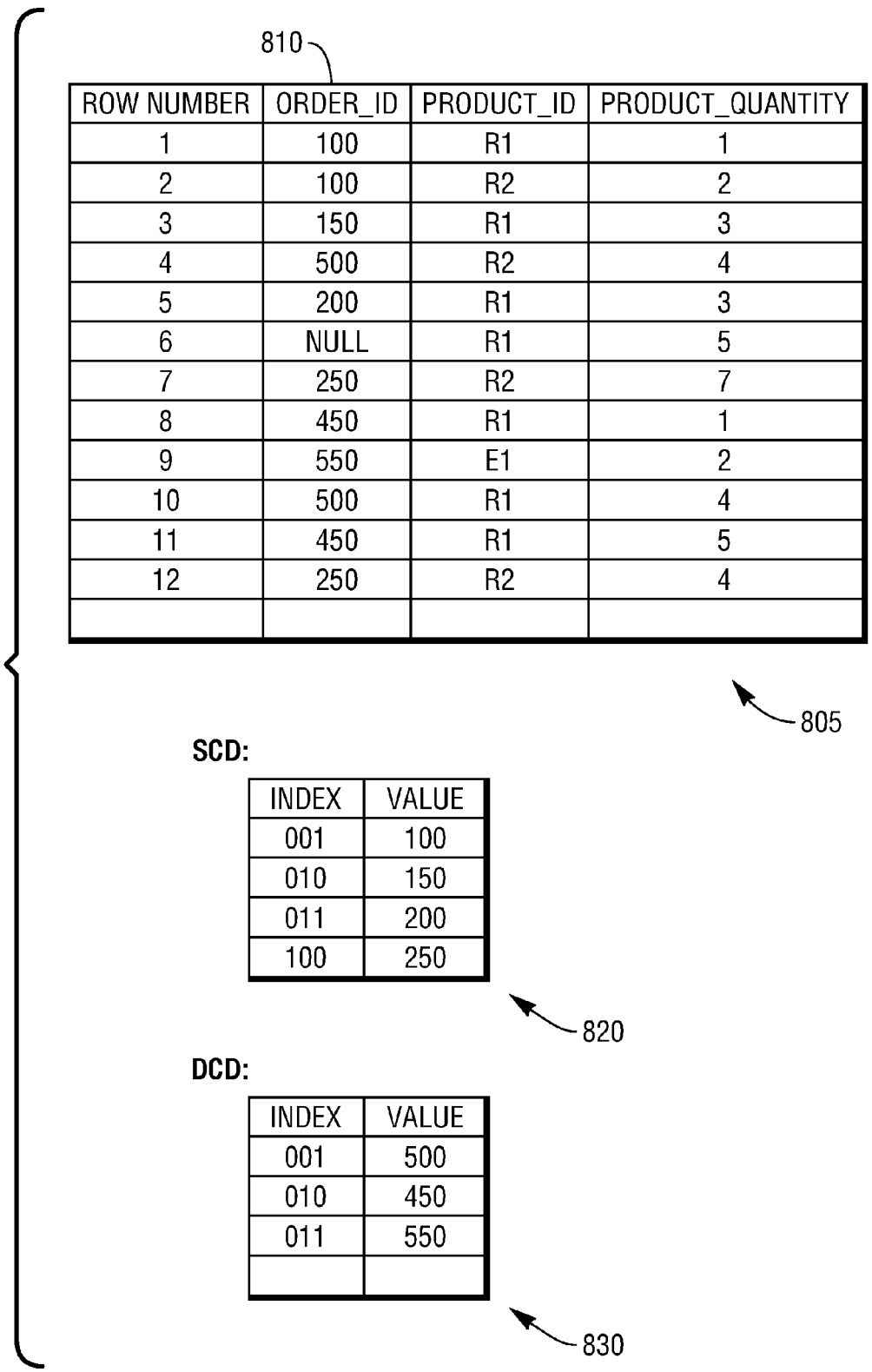
FIGS. 8 and 9 provide a representation of a process for compressing database table column data into a container row utilizing a static compression dictionary and dynamic compression dictionary in accordance with the present invention.
Figure 9:
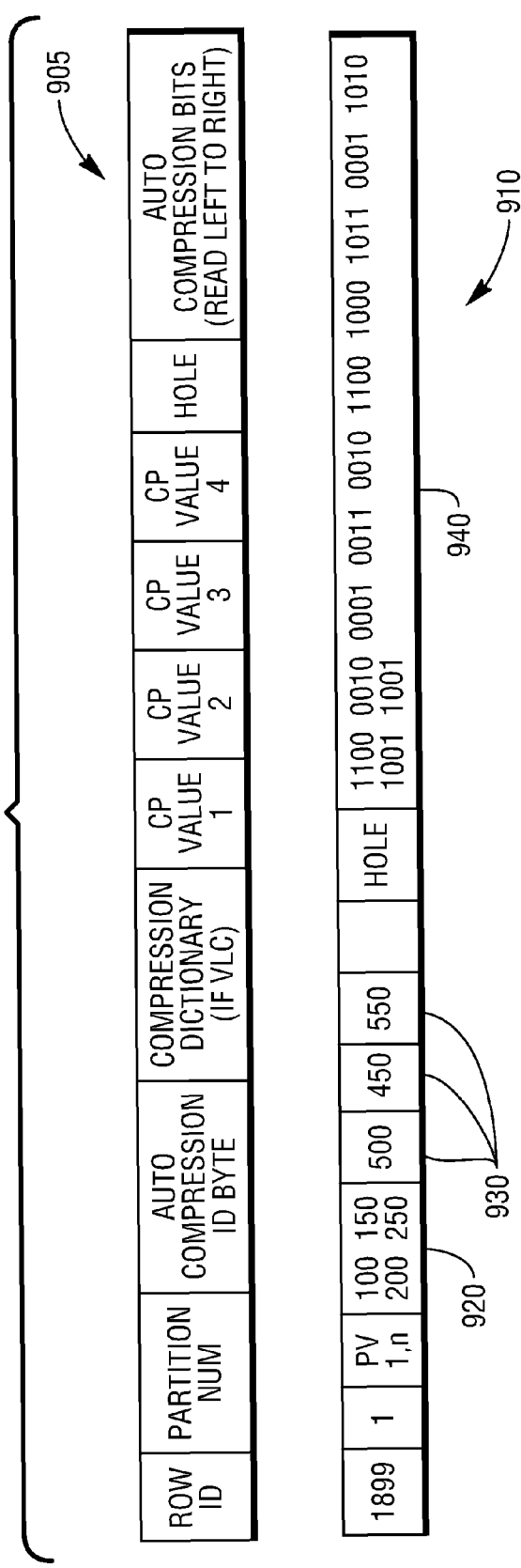

Referring now to FIGS. 8 and 9, a process for compressing database table column data into a container row, utilizing a static compression dictionary and dynamic compression dictionary, will be described.

Table 805 provides a simple example of sales data for a business, with each row in the table containing information for one sales order. Each row includes a row number, an order ID number, a product ID number, and product quantity. The values in the Order_ID field column 810 are compressed using a static compression dictionary 820 and a dynamic compression dictionary 830, and stored within a container row 910, shown in FIG. 9, having the container row format 905.

Within container row 910, the static compression dictionary is saved in field 920, the dynamic compression dictionary is saved in fields 930, and the compressed data values corresponding to the Order_ID values from column 810 of table 805 are saved in field 940. Access to each dictionary is direct based on its indexed location. The dynamic compression dictionary 930 is variable in size and can grow as values are inserted.

Contents of the dynamic compression dictionary are not sorted. The DCD is unsorted for a couple of reasons: 1) it is suitable for large volume inserts; 2) ease of insertion—if the number of unique value exceeds the SCD size, then infrequently occurring values are added to DCD but can still be accessed efficiently; and 3) unlike the SCD, an unsorted DCD is amenable to modifications.

The compressed values contained in field 940 consist of a first bit to specify the compression dictionary used during value compression, and a set of bits to indicate the offset (for direct access) into the specified dictionary. An offset of zero indicates a NULL value for the value. If the index is nonzero and the dictionary bit is set to 1 then the index is a pointer into the SCD. If the index is nonzero and the dictionary bit is set to 0, then the index is a pointer to a value in DCD. This auto-compression technique could be used irrespective of the presence or absence of nulls. Additional presence bit is not required to represent the NULL; instead the index is set to zero if the value is NULL.

Figure 10:
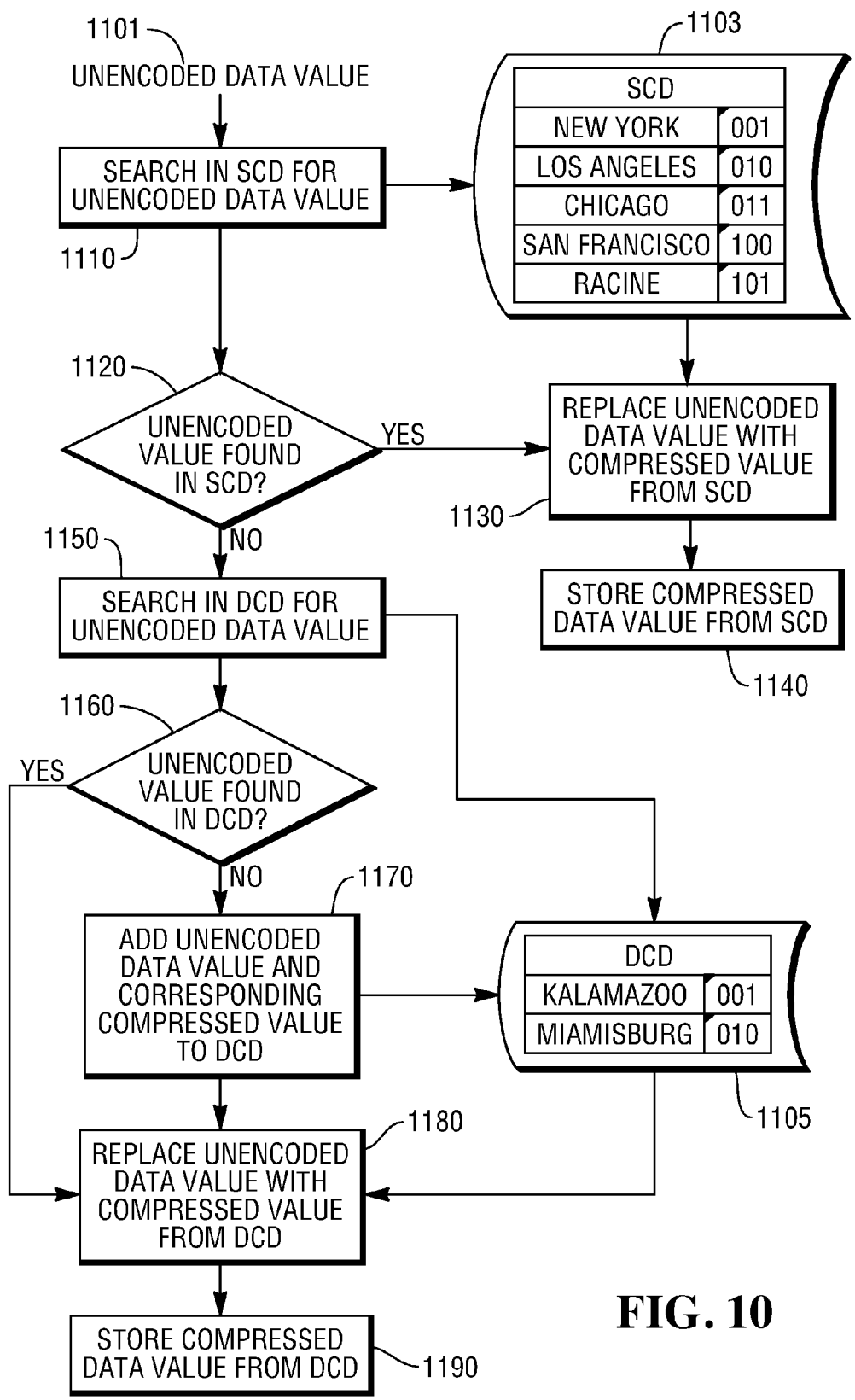
FIG. 10 is a simple flowchart illustrating a process for compressing data in accordance with the present invention

The improved value list process for compressing data using a dynamic compression dictionary, and updating the dynamic compression dictionary, is illustrated in the flowchart of FIG. 10. The process begins with the receipt of an uncompressed data value 1101. A search for the value in the SCD 1103 is using a binary search algorithm is conducted in step 1110. If the uncompressed value is found in the SCD, then the associated compressed code value is retrieved from SCD 1103 and saved, together with a preceding index bit of "1" indicating the compressed code value was obtained from SCD 1103, as shown in steps 1120, 1130 and 1140.

If the uncompressed data value is not found in SCD 1103, a search for the value in DCD 1105 is conducted in step 1150. If the uncompressed value is found in the DCD, then the associated compressed code value is retrieved from DCD 1105 and saved, together with a preceding index bit of "0" indicating the compressed code value was obtained from DSCD 1105, as shown in steps 1160, 1180 and 1190.

When the uncompressed data value is not found in either the static or dynamic compression dictionaries, 1103 and 1105, respectively, this "new" uncompressed data value and a corresponding compressed code value are added to DCD 1105, as shown in step 1170. This new compressed code value is also saved to data storage with a "0" index bit, as shown by steps 1170, 1180 and 1190.

It should be noted that the search into the unsorted DCD is linear and can become expensive for large list sizes. To address this issue, the search for a value in the DCD should only be undertaken if the list size is small. For large list sizes, the new incoming value can be simply appended to DCD. It is also possible to limit the search to a small percentage of the DCD, such as the last value added, or some small number of values.

The size of the dictionary can be ascertained from the "last used" index for the dictionary. This technique is dynamic depending upon a tradeoff that can be turned off without compromising correctness. Alternatively, the size of the DCD can be set by the user, can be a user-specified percentage of the SCD, or can be determined by the system based on a number of parameters not necessarily limited to the container row size, the number of unique values in the SCD, or the number of rows represented by the SCD, i.e., the hit ratio of the SCD.

CONCLUSION

The improved compression technique described herein increases the level of compression when compared to techniques which store new values in an uncompressed value list without dictionary support. This is because such lists are unsuitable for value list compression techniques for newly arriving (inserted) values that are not in the SCD. The compression techniques possible in such cases are limited to run-length, which requires that recurring values be adjacent to each other, and that a previous value must be located using a linear traversal of the uncompressed value list.

The improved compression technique described herein can be combined with other compression techniques, such as Run Length compression, trim length compression, and multi-value compression techniques.

The container row compression techniques described above are not limited to container rows that store a single column value, and may be applied to multi-column value container rows, such as a container row that stores Social Security Number and Employee Number fields (columns) rather than just the Social Security Number or Employee Number field (column). These compression techniques can also be combined with table level compression for a column, also known as multi-value compression or MVC Instructions of the various software routines discussed herein, such as the method illustrated in FIG. 10, are stored on one or more storage modules in the system shown in FIG. 1, and loaded for execution on corresponding control units or computer processors. The control units or processors include microprocessors, microcontrollers, processor modules or subsystems, or other control or computing devices. As used here, a "controller" refers to hardware, software, or a combination thereof. A "controller" can refer to a single component or to plural components, whether software or hardware.

Data and instructions of the various software routines are stored in respective storage modules, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines are loaded or transported to each device or system in one of many different ways. For example, code segments including instructions stored on floppy disks, CD or DVD media, a hard disk, or transported through a network interface card, modem, or other interface device are loaded into the device or system and executed as corresponding software modules or layers.

The foregoing description of the invention has been presented for purposes of illustration and description. It is not intended to be exhaustive or to limit the invention to the precise form disclosed.

Additional alternatives, modifications, and variations will be apparent to those skilled in the art in light of the above teaching. Accordingly, this invention is intended to embrace all alternatives, modifications, equivalents, and variations that fall within the spirit and broad scope of the attached claims.

The invention claimed is:

1. A method for compressing data within a computer system, the method comprising the steps of:
   receiving, by said computer system, an uncompressed data value;
   searching, by said computer system, for said uncompressed data value in a static compression dictionary, said static compression dictionary containing a plurality of uncompressed data values and corresponding compressed code values;
   if the uncompressed data value is found in the static compression dictionary, replacing the uncompressed data value with its corresponding compressed code value from said static compression dictionary and storing the corresponding compressed code value within a data storage device;
   if the uncompressed data value is not found in the static compression dictionary, searching, by said computer system, for said uncompressed data value in a dynamic compression dictionary, said dynamic compression dictionary for storing one or more additional uncompressed data values and corresponding compressed code values not contained within said static compression dictionary;
   if the uncompressed data value is found in the dynamic compression dictionary, replacing the uncompressed data value with its corresponding compressed code value from said dynamic compression dictionary and storing the corresponding compressed code value within said data storage device; and
   if the uncompressed data value is not found in the static compression dictionary and not found in the dynamic compression dictionary, adding, by said computer system, the uncompressed data value and a unique corresponding compressed code value to said dynamic compression dictionary, and storing the unique corresponding compressed code value within said data storage device;
   wherein said unique corresponding compressed code value is stored within a column in a database table maintained on said data storage device and managed by said computer system; and
   said static compression dictionary, said dynamic compression dictionary, and compressed code values contained within said column in said database table are stored within a container row.

2. The method for compressing data within a computer system in accordance with claim 1, wherein:
   said corresponding compressed code values comprise a binary bit sequence having a first bit having a first value identifying said static compression dictionary as the source of said corresponding compressed code value, and a second value identifying said dynamic compression dictionary as the source of said corresponding compressed code value.

3. The method for compressing data within a computer system in accordance with claim 1, wherein:
   said corresponding compressed code values comprise a first range of values maintained within said static compression dictionary, and a second range of values maintained within said dynamic compression dictionary.

4. The method for compressing data within a computer system in accordance with claim 1, wherein said dynamic compression dictionary has a size set by a user.

5. The method for compressing data within a computer system in accordance with claim 1, wherein said dynamic compression dictionary has a size set to a percentage of the size of said static compression dictionary.

6. The method for compressing data within a computer system in accordance with claim 1, wherein said dynamic compression dictionary has a size determined by said computer system based upon one or more computer system parameters.

7. A computer system, comprising:
   a data storage device; and
   a processor for:
      receiving an uncompressed data value;

searching for said uncompressed data value in a static compression dictionary, said static compression dictionary containing a plurality of uncompressed data values and corresponding compressed code values;

if the uncompressed data value is found in the static compression dictionary, replacing the uncompressed data value with its corresponding compressed code value from said static compression dictionary and storing the corresponding compressed code value within said data storage device;

if the uncompressed data value is not found in the static compression dictionary, searching, by said computer system, for said uncompressed data value in a dynamic compression dictionary, said dynamic compression dictionary for storing one or more additional uncompressed data values and corresponding compressed code values not contained within said static compression dictionary;

if the uncompressed data value is found in the dynamic compression dictionary, replacing the uncompressed data value with its corresponding compressed code value from said dynamic compression dictionary and storing the corresponding compressed code value within said data storage device; and if the uncompressed data value is not found either the static compression dictionary or the dynamic compression dictionary, adding, by said computer system, the uncompressed data value and a unique corresponding compressed code value to said dynamic compression dictionary, and storing the unique corresponding compressed code value within said data storage device;

wherein said unique corresponding compressed code value is stored within a column in a database table maintained on said data storage device and managed by said computer system; and said static compression dictionary, said dynamic compression dictionary, and compressed code values contained within said column in said database table are stored within a container row.

8. The computer system in accordance with claim 7, wherein:

said corresponding compressed code values comprise a binary bit sequence having a first bit having a first value identifying said static compression dictionary as the source of said corresponding compressed code value, and a second value identifying said dynamic compression dictionary as the source of said corresponding compressed code value.

9. The computer system in accordance with claim 7, wherein:

said corresponding compressed code values comprise a first range of values maintained within said static compression dictionary, and a second range of values maintained within said dynamic compression dictionary.

10. The computer system in accordance with claim 7, wherein said dynamic compression dictionary has a size set by a user.

11. The computer system in accordance with claim 7, wherein said dynamic compression dictionary has a size set to a percentage of the size of said static compression dictionary.

12. The computer system in accordance with claim 7, wherein said dynamic compression dictionary has a size determined by said computer system based upon one or more computer system parameters.

\* \* \* \* \*